United States Patent Office 3,551,179
Patented Dec. 29, 1970

3,551,179
NONAQUEOUS ADHESIVE SYSTEM FOR USE IN AN ELECTROSTATIC FLOCKING METHOD
Vincent J. Moser, Hatboro, Walter Greizerstein, Maple Glen, and Roger H. Kottke, Doylestown, Pa., assignors to Rohm and Haas Company, Philadelphia, Pa., a corporation of Delaware
No Drawing. Filed Aug. 10, 1967, Ser. No. 659,587
Int. Cl. B44c 1/08
U.S. Cl. 117—17    15 Claims

ABSTRACT OF THE DISCLOSURE

An electrostatic flocking method employing as the improvement therein, an adhesive composition comprising a nonaqueous dispersion containing (A) an addition polymer which is dispersed, but not dissolved in a hydrocarbon medium, (B) an aminoplast, which is a condensate of formaldehyde with a nitrogen compound and a higher aliphatic alcohol and (C) an acid catalyst is used as an adhesive. The adhesive thus composed provides flocked articles characterized by improved water-resistance, wet abrasion or crock resistance, wet and dry peel strengths, washfastness, drycleanability and higher flock density. In addition, the flock adhesive is also characterized by improved flow properties, and a resistance to arcing when employed in electrically motivated flocking processes.

This invention relates to novel adhesive compositions used in producing flocked or fluffed articles having improved properties, such as excellent water-resistance, washfastness, drycleanability and wet crock or abrasion resistance, to methods for their use and to the articles produced therefrom. More particularly, this invention relates to a flock adhesive system based on a nonaqueous dispersion of an addition polymer in the for mof fine particles insoluble in the dispersing medium, but dispersed therein in a condition of stability.

Generally, flock adhesive compositions have been based on aqueous dispersion systems, or organic solvent solution systems. For example, U.S. Pat. 3,249,457 discloses a flock adhesive composition consisting of an aqueous system based on an acrylic-melamine condensate in combination with an acrylic latex consisting of an aqueous dispersion of a copolymer of methyl methacrylate, methacrylic acid or itaconic acid and ethyl acrylate.

A large amount of fabric laminates, flocked fabrics and bonded nonwovens are designed into wearing apparel, therefore the adhesive composition used in these articles must possess certain characteristics needed to fit the finished product for the particular end use. An important charactertistic required for the adhesive used in most items of apparel is resistance to water, so that the article is washfast and resistant to wet abrasion. The prior art has attempted to develop a flocked article having these characteristics, but the results achieved have not been entirely satisfactory. For example, U.S. Pat. 3,249,457 discloses the obtention of a flocked article that showed wear after only 10,000 rubs when wet abrasion resistance was measured by means of a Crockmeter. These results obtained in the wet crock resistance test, although still unsatisfactory, were significantly superior to results obtained for flocked articles using other prior art flock adhesives; the latter flocked articles failed after only 125 and 190 rubs. A comparative showing of the wet abrasion resistance of the flocked articles of this invention will be fully discussed hereinbelow.

It is an object of this invention to provide flocked articles having improved water-resistance, improved wet abrasion or crock resistance, improved washfastness and drycleanability, and higher flock density. It is another object of this invention to provide a flock adhesive capable of imparting the improved characteristics noted above to a flocked article, and also capable of providing rubber-to-flocked article laminates having improved wet and dry peel strengths. It is still a further object of this invention to provide a fabric material coated with an adhesive that will not arc when submitted to an alternating current electrostatic flocking machine. It is yet another object of this invention to provide a flock adhesive having improved flow properties for flock printing.

It has been discovered that the use of adhesives based on nonaqueous dispersions of polymers which are cross-linked by means of an acid catalyst with an aminoplast, defined hereinbelow, provide flocked fabrics having the desired characteristics described hereinabove. The flock adhesives of this invention also have an unexpectedly higher solids content than those obtained from solvent solution, or aqueous dispersion systems.

In accordance with this invention, a nonaqueous dispersion comprising the reaction product of (A) an addition polymer formed from at least one monoethylenically unsaturated monomer having a group $CH_2=C<$ dispersed, but not dissolved, in a hydrocarbon medium consisting essentially of one, or a mixture of one or more liquid aliphatic hydrocarbons, or mixtures of a major amount of an aliphatic hydrocarbon and a minor amount of an aromatic hydrocarbon, (B) an aminoplast resin, which is a thermosetting material formed by the condensation of formaldehyde with a nitrogen compound and a higher aliphatic alcohol, and (C) an acid catalyst and a suitable dispersant is used an an adhesive. The aminoplast, component (B), and the acid catalyst, component (C), are added to a nonaqueous dispersion of polymer, component (A). The proportion of the nonaqueous dispersion of polymer, component (A), in the adhesive composition, based on the total weight of the adhesive composition, is from about 8 to about 94 weight percent; a range of from about 89 to about 91 weight percent is preferred. The proportion of polymerizable monomeric material in the nonaqueous dispersion pre-polymer is from about 50 to about 60 weight percent, based on the combined total weight of monomeric material, dispersant and dispersing medium. The proportion of aminoplast, component (B), in the adhesive composition, based on the total weight of dispersion solids is from about 2 to about 10 weight percent; the preferred proportion of aminoplast is from about 4 to about 8 weight percent. The proportion of acid catalyst, component (C), in the adhesive composition, based on the total weight of dispersion solids, is from about 3 to about 7 weight percent; the preferred proportion of catalyst is from about 4 to about 6 weight percent. The total solids content for the adhesive composition may range from about 55 to about 65 weight percent, based on the total weight of the adhesive composition; the preferred range is from about 58 to about 61 weight percent.

The monomers that can be used to produce the dispersed, but undissolved, addition polymers of the present invention may be any monoethylenically unsaturated monomer which if used alone does not produce a polymer soluble in the hydrocarbon medium employed, or if used with other monomers does not produce with the monomers used a copolymer soluble in such media. Representative monomers include acrylonitrile and methacrylonitrile, acrylic acid, methacrylic acid, itaconic acid, and the esters of these acids, especially of acrylic or methacrylic acids, with saturated alcohols having 1 to 4 carbon atoms, the monoesters of ethylenically unsaturated dicarboxylic acids, such as methyl hydrogen itaconate, vinyl esters of acids having 1 to 3 carbon atoms, acrylamide, methacrylamide, vinyl chloride, and vinylidene chloride. In general, polymers and copolymers having any proportion of one or more of these several monomers produce polymers and copolymers which are adequately insoluble in the hydrocarbon solvent used.

In addition to the monomers above, a minor proportion of a vinyl aromatic compound such as, styrene, vinyl toluene or vinyl naphthalene and similar proportions of higher saturated alcohol esters of acrylic acid or methacrylic acid or of higher aliphatic vinyl esters, such as those of the acids having from 4 to 18 carbon atoms may be used. For example, esters of alcohols having from 5 to 18 carbon atoms with acrylic esters mentioned which tend to impart hydrocarbon solubility to copolymers produced therefrom may be used in conjunction with other monomers to the extent that the resulting copolymer does not become soluble in the particular hydrocarbon medium employed.

The preferred nonaqueous polymer dispersions are dispersions of acrylic copolymers, such as copolymers of 5 to 10% methyl methacrylate (MMA), 2.5 to 10% hydroxyethyl methacrylate (HEMA), 2.5 to 5% methyl hydrogen itaconate (MHI) and the balance ethyl acrylate (EA) copolymers of 5 to 10% MMA, 2.5 to 10% HEMA, 2 to 7.5% acrylic acid (AA) or methacrylic acid (MAA) and the balance EA. The most preferred polymer dispersion system is one containing acrylic acid units in the copolymer.

The dispersion medium used in this invention consists essentially of liquid aliphatic hydrocarbons. A pure aliphatic hydrocarbon or a mixture of one or more may be employed. To the extent that any particular polymer produced is insoluble in the hydrocarbon medium resulting, the essentially aliphatic hydrocarbon may be modified by the incorporation of other solvent materials, such as aromatic or naphthenic hydrocarbons and in certain instances the amount of such nonaliphatic component may attain as high as 49% by weight of the entire liquid medium. However, the liquid medium preferably consists essentially of aliphatic hydrocarbons, and in general the compositions of the present invention contain less than 25% by weight, based on the weight of the liquid medium, of an aromatic hydrocarbon and often none at all.

It is essential that the hydracarbon be of liquid character, but it may have a wide boiling range from a minimum of about $-50°$ C. (in which case high pressures may be needed in the polymerization) to a maximum which may be as high as $520°$ C. For most purposes, the boiling point should be from about $75°$ C. up to about $200°$ C. For example, petroleum naphthas having a boiling range of $115-145°$ C. and mineral spirits having a boiling range of $160-195°$ C. are suitable dispersing mediums for this invention.

The term "essentially" as used in the definition of the ingredients present in the liquid medium claimed is intended to exclude the presence of other materials in such amounts as to interfere substantially with the properties and characteristics possessed by the composition set forth but to permit the presence of other materials in such amounts as not substantially to affect said properties and characteristics adversely.

The preferred dispersing agent is a copolymer of lauryl methacrylate (LMA), isobutyl methacrylate (i-BMA) and hydroxyethyl methacrylate (HEMA) in the respective percentages by weight, based on the total weight of the monomeric material, of 45% by weight LMA, 45% by weight i-BMa and 10% by weight HEMA. An alternative, but less preferred, dispersing agent is a 50/50 copolymer of LMA and i-BMA.

The amount of dispersant in the nonaqueous polymerization medium ranges from about 2.5 to about 8 weight percent, based on the weight of the monomeric material to be polymerized. The preferred concentration of dispersing agent is from about 3 to about 5 weight percent.

Representative of the aminoplasts, or thermosetting materials formed by the condensation of formaldehyde with a nitrogen compound and an aliphatic alcohol, used in this invention are condensates of isophthalamide, formaldehyde and isooctyl alcohol, and condensates of melamine and formaldehyde with n-butanol or methanol. The triazine based aminoplasts are preferred, such as those based on melamine, a cyclic trimer of cyanamide. A particularly preferred aminoplast is the condensation product of n-butanol, formaldehyde and melamine. Other triazines related to melamine in structure may also be used in the practice of this invention. The triazine based aminoplasts, among other things, serve to speed the curing rate of the adhesives of this invention. The alcohol moiety of the aminoplast may be varied to alter the flow properties and the solubility characteristics of the flock adhesive, as well as vary the compatibility of the aminoplast with the nonaqueous polymer dispersion.

The catalytic component (C), of this invention is a strong acid, such as butylphosphoric acid, p-toluene sulfonic acid, or benzene sulfonic acid, which is dispersible in and compatible with the nonaqueous hydrocarbon system. The catalyst further promotes crosslinking between the aminoplast and the polymer dispersed in the nonaqueous medium.

The adhesive of this invention may be used in the production of flocked articles. The textile fabric backing of the flocked article is preliminarily coated on one surface with the adhesive of this invention, and then fibrous flock is deposited on the coated backing either electrostatically or mechanically. The flocked article is then dried and cured at temperatures ranging from about $70°$ C. to about $150°$ C.; the curing time and temperature are adapted to the characteristics of the flock material and the backing material.

Ground nylon (40 mesh), viscose rayon (3-den., 0.75 mm.) and polypropylene (6-den., 1.5 mm.) may be used as flock material in the practice of this invention. The flock material can be readily applied to a backing material which is coated with the flock adhesive of this invention. Suitable backing materials are cotton duck, spunbonded polyester nonwoven fabric, expanded polyvinyl chloride film and the like.

To assist those skilled in the art to practice this invention, the following procedures are suggested by way of illustration, parts and percentages being by weight unless otherwise specifically noted.

(1) To a mixture of 492 g. of petroleum naphtha having a boiling range of $160-195°$ C. and 36 g. of a copolymer of lauryl methacrylate (LMA), iso-butyl methacrylate (i-BMA) and hydroxyethyl methacrylate (HEMA) in the respective weight ratio of 45/45/10 in a suitable reaction vessel equipped with an agitator, reflux condenser, gas inlet and temperature control devices are added 17 g. ethyl acrylate (EA), 10.5 g. methyl methacrylate (MMA), 10.5 g. hydroxyethyl methacrylate, 10.5 g. of methyl hydrogen itaconate (MHI) and 0.80 g. benzoyl peroxide. The agitator is started and the reaction vessel is evacuated and repressurized with nitrogen. A slow stream of nitrogen is passed through the reaction vessel throughout the course of the ensuing polymerization reaction. The mixture is heated to $88-92°$ C. and held at this temperature for about 90 minutes. Then a solution of 841 g. EA, 49.5 g. MMA, 49.5 g. HEMA, 49.5 g. MHI, 196 g. petroleum naphtha and 2.59 g. benzoyl peroxide predissolved in 70 g. toluene is added over a 240 minute period. The mixture is held at $88-92°$ C. for about 30 minutes. A solution of 3.08 g. lauroyl peroxide in 62 g. petroleum naphtha is then added over a 90 minute period. The reaction mixture is held at $88-92°$ C. for another 120 minutes. Cooling is applied until the temperature is below $60°$ C. The condenser is set for distillation. A vacuum is applied and 195 g. of strippings are obtained. The stripped material is then transferred to another flask. The stripped material amounts to about 1557 g. To the stripped material is added at 50° C. about 109 g. of a butylated melamine-formaldehyde resin (50% solids in butanol-xylene), 47 g. butylphosphoric acid and 70 g. of petroleum naphtha. The product is stirred at 50° C. for about 30 minutes and then removed from the reaction flask. Solids content is 60.7%.

(2) The adhesive composition of procedure (1) is uniformly spread on the upper surface of a cotton duck by means of a Gardner film-casting knife at a knife opening of about 0.01 inch. Ground nylon flock (40 mesh) is then mechanically deposited on the surface of the adhesive while vibrating the adhesive coated fabric with a beater bar. The flocked article is air dried at room temperature for about 5 minutes and maintained at 140° C. for about 5 minutes. After curing, the flocked article possesses an excellent flock density, a pleasing hand, excellent water-resistance, wash fastness, solvent-resistance and wet abrasion (rub) resistance.

(3) A test piece from the flocked article produced in procedure (2) was placed in a Mason jar containing 100 cc. of tap water, 0.5% of "Lux" soap, a common household soap, 0.2% sodium carbonate and 10 steel balls having a diameter of about 0.25 inch. The jar was placed in a tumbling apparatus and rotated for about 45 minutes at 70° C. At the completion of this wash cycle the flocked article possessed the same flock density at it possessed before washing, as well as an equally pleasing hand and acceptable appearance.

(4) Two test pieces of the flocked article produced in procedure (2) were tested for wet and dry abrasion resistance. The testing was conducted with a Taber Abraser Model 174, equipped with CS-17 wheels and 1,000 g. weights. One of the flocked article test pieces was soaked in water for about 24 hours at room temperature prior to the wet abrasion resistance test. The number of abrasion cycles (or rubs) necessary to produce signifiacnt wear in the test pieces was measured. The dry samples required as many as 2,000 abrasion cycles before it exhibited significant wear. The wet sample also required 2,000 abrasion cycles before it exhibited significant wear.

(5) A flocked article was produced in the same way as described in procedure (2), except the nonaqueous acrylate dispersion used in procedure (1) was replaced by an aqueous acrylate dispersion of a cpolymer of ethyl acrylate/acrylonitrile/methylol acrylamide in the weight proportions of 86/10/4. Two test pieces of this flocked article were tested for wet and dry abrasion resistance in the same way as the flocked articles produced by procedure (2). The wet sample required only 75 abrasion cycles before it exhibited significant wear, and the dry sample required only 190 abrasion cycles before it exhibited significant wear.

(6) Two test pieces of the flocked article produced in procedure (2) were each laminated to conventional, uncured synthetic rubber (GR–S) stock, which is a commercial synthetic rubber composed approximately of a 75%–25% butadiene/styrene interpolymer prepared according to U.S. Pat. No. 1,938,731. The lamination was carried out by pressing the rubber stock to the flocked side of the test piece in a mold at 300° F. The laminate was then tested to determine the strength of the rubber-to-flocked article bond. This measure of bond strength was expressed in terms of the number of pounds of force per inch width required to pull the flocked article from the rubber; it is commonly referred to as the peel strength. In the peel test, one end of the rubber component of the rubber-to-flocked article laminate was gripped in the jaws of an Instron tensile tester and the laminate was held while the rubber was peeled away at an angle of 90 degrees to the surface of the laminate. The rate of jaw separation was 12 in./minute. The average pull in pounds was taken from the chart and the peel strength was calculated in pounds per inch of rubber width. Peel strength tests were conducted to determine both the dry and the wet peel strengths. One of the laminates exhibited a dry peel strength of 7.1 lb./in. width, and the other laminate, which was soaked in water for about 24 hours at room temperature prior to the test, exhibited a wet peel strength of 7.9 lb./in. width.

(7) Two laminates were prepared in the same way as in procedure (6) except the adhesive composition based on the aqueous acrylate dispersion of procedure (5) was used in place of the adhesive composition based on the nonaqueous acrylate dispersion used in procedure (1). Peel strength tests were carried out in the same way as procedure (6). One of the laminates exhibited a dry peel strength of only 5.8 lb./in. width, and the other laminate exhibited a wet peel strength of only 2.8 lb./in. width.

(8) An adhesive composition was produced in the same way as described in procedure (1) above, except acrylic acid was substituted for methyl hydrogen itaconate.

(9) The adhesive composition of procedure (8) was uniformly applied to a cotton fabric with a silk screen stencil. Acrylic fiber flock was deposited on the adhesive with an AC electrostatic flocking machine operating at 50,000 volts. No arcing occurred during the flocking operation. The flocked article was then simultaneously dried and cured in an oven at about 150° C. for about 5 minutes. The resultant flocked article possessed the same acceptable characteristics as flocked article produced in procedure (2) and also exhibited a well defined printed design.

It is to be understood that changes and variations may be made without departing from the spirit and scope of the invention as defined by the appended claims.

What is claimed is:

1. In a method for producing a flocked article comprising the steps of applying an adhesive composition to that surface of the article which is intended to receive a coating of fibers, electrostatically depositing fibrous flock material on the adhesive layer, and then drying and heating the fiber-coated article to cure the adhesive to solvent-resistant condition, the improvement wherein there is applied as the adhesive composition, a dispersion of an addition polymer formed from at least one monoethylenically unsaturated monomer having a group $CH_2=C<$ in an essentially aliphatic hydrocarbon medium in which the polymer is not dissolved containing, dissolved therein, an alkylated aminoplast, the polymer containing units having a group reactive with the aminoplast during the heating step.

2. In a method for producing a flocked article comprising the steps of applying an adhesive composition to that surface of the article which is intended to receive a coating of fibers, electrostatically depositing fibrous flock material on the adhesive layer, and then drying and heating the fiber-coated article to cure the adhesive to solvent-resistant condition, the improvement wherein there is applied as the adhesive composition, a dispersion of an addition polymer formed from at least one monoethylenically unsaturated monomer having a group $$CH_2=C<$$

in an essentially aliphatic hydrocarbon medium in which the polymer is not dissolved containing, dissolved therein, an alkylated aminoplast, the polymer containing units having a group reactive with the aminoplast during the heating step, and an acid catalyst for the reaction between the polymer and the aminoplast.

3. A method according to claim 1 in which the article to be covered with flock is a textile fabric.

4. A method according to claim 2 wherein the polymer, the aminoplast, and the catalyst are present in the proportions of about 88 to about 94, about 2 to about 10, and about 3 to about 7 percent by weight respectively, all based on total solids.

5. A method according to claim 1 wherein the dispersion has a solids content of from about 55 to about 65 percent by weight, based on the total weight of the dispersion.

6. A method according to claim 1 wherein the aminoplast is a condensation product of melamine, formaldehyde and an aliphatic alcohol.

7. A method according to claim 1 wherein the aminoplast is a condensation product of melamine, formaldehyde and butanol.

8. A method according to claim 1 in which the addition polymer comprises ethyl acrylate, from about 5 to about 10 weight percent methyl methacrylate, from about 2.5 to about 10 weight percent hydroxyethyl methacrylate, and from about 2.5 to about 5 weight percent methyl hydrogen itaconate.

9. A method according to claim 1 in which the addition polymer comprises ethyl acrylate, from about 5 to about 10 weight percent methyl methacrylate, from about 2.5 to about 10 weight percent hydroxyethyl methacrylate, and from about 2 to about 7.5 weight percent acrylic acid.

10. A method according to claim 1 wherein the polymer is a copolymer of ethyl acrylate, acrylonitrile and N-methylolacrylamide.

11. A method according to claim 2 in which the article to be covered with flock is a textile fabric, the polymer, the aminoplast, and the catalyst are present in the proportion of about 88 to about 94, about 2 to about 10, and about 3 to about 7 percent by weight respectively, these percentages being based on total solids, the dispersion has a solids content of from about 55 to about 65 percent by weight, based on the total weight of the dispersion, the aminoplast is a condensation product of melamine, formaldehyde and an aliphatic alcohol.

12. A method according to claim 11 wherein the curing stage includes a temperature of about 140 to about 150° C.

13. A method according to claim 11 in which the addition polymer comprises ethyl acrylate, from about 5 to about 10 weight percent methyl methacrylate, from about 2.5 to about 10 weight percent hydroxyethyl methacrylate, and from about 2.5 to about 5 weight percent methyl hydrogen itaconate.

14. A method according to claim 11 in which the addition polymer comprises ethyl acrylate, from about 5 to about 10 weight percent methyl methacrylate, from about 2.5 to about 10 weight percent hydroxyethyl methacrylate, and from about 2 to about 7.5 weight percent acrylic acid.

15. A method according to claim 11 wherein the polymer is a copolymer of ethyl acrylate, acrylonitrile and N-methylolacrylamide.

References Cited

UNITED STATES PATENTS

| 2,684,346 | 7/1954 | Nickerson | 117—139.4 |
| 2,931,742 | 4/1960 | Hicks | 260—851 |
| 2,949,386 | 8/1960 | Cassel | 117—161UIT |
| 2,976,167 | 3/1961 | Maeder et al. | 117—33 |
| 3,090,762 | 5/1963 | Maeder et al. | 117—161UIT |
| 3,095,388 | 6/1963 | Osmond et al. | 260—33.6 |
| 3,183,282 | 5/1965 | Hurwitz | 117—161LN |
| 3,261,788 | 7/1966 | Carter et al. | 260—33.6 |
| 3,262,838 | 7/1966 | Vieth et al. | 117—161UIT |
| 3,284,394 | 11/1966 | Suen et al. | 260—856 |
| 3,298,990 | 1/1967 | Cousens et al. | 260—851 |
| 3,365,414 | 1/1968 | Fisk et al. | 260—33.4 |
| 3,374,289 | 3/1968 | Ott et al. | 117—33 |
| 3,394,028 | 7/1968 | Nachbur | 117—161LN |

FOREIGN PATENTS

| 1,363,579 | 6/1963 | France | 117—33 |

WILLIAM D. MARTIN, Primary Examiner

R. M. SPEER, Assistant Examiner

U.S. Cl. X.R.

117—25, 33; 260—33.6, 851, 856